June 30, 1936.  G. W. SCHEPMAN ET AL  2,045,730
FROZEN CONFECTION AND METHOD OF FORMING AND DISPENSING
Filed July 1, 1932
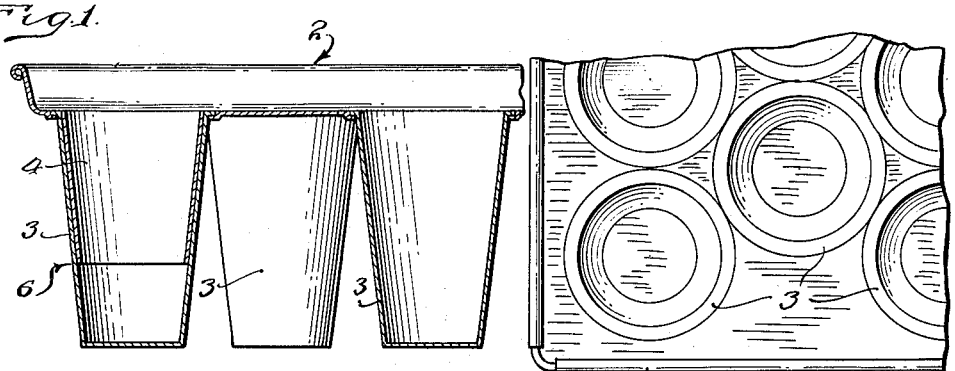
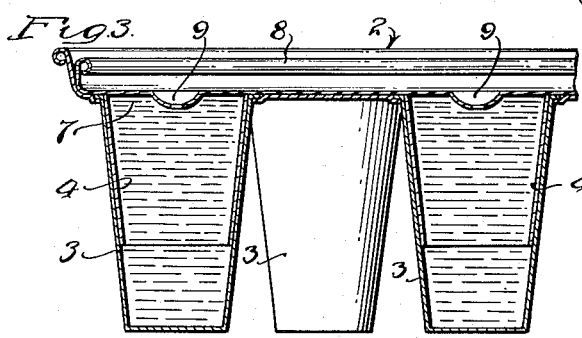
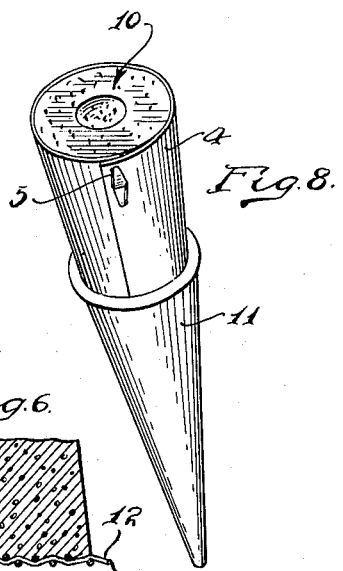
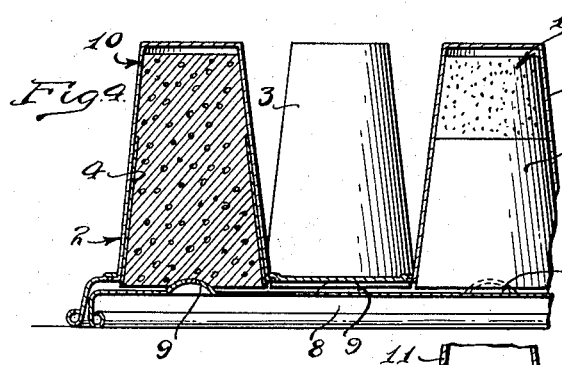
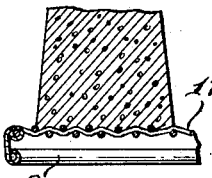
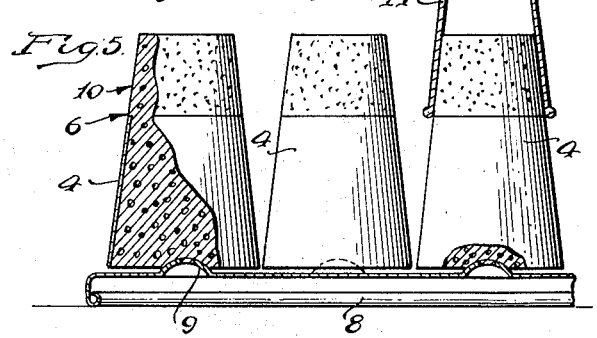
INVENTORS.
GEORGE W. SCHEPMAN.
WILLIAM W. MERYDITH.
BY
ATTORNEYS

Patented June 30, 1936

2,045,730

UNITED STATES PATENT OFFICE 2,045,730

FROZEN CONFECTION AND METHOD OF FORMING AND DISPENSING

George W. Schepman and William W. Merydith, Detroit, Mich.

Application July 1, 1932, Serial No. 620,338

7 Claims. (Cl. 99—137)

This invention relates to a frozen confection and method of forming and dispensing, and has to do particularly with a novel shaped ice cream mold for cones and method of forming and assembling the same in the cone.

Many attempts have recently been made to effect improvements in the handling and eating of ice cream and particularly ice cream cones. The present invention resides in improvements to the mold of ice cream itself as well as to the method of forming, storing, and dispensing. The mold of ice cream is preferably such as to eliminate all dripping during eating thereof, it is provided with a special shape and is designed to extend only a relatively small distance within the cone. In addition, we have not only provided an efficacious way of forming the mold of ice cream but the method of forming includes means for easy handling and packing of the individual molds and results in complete sanitation of all the steps from the molding to insertion in the cone.

In the drawing:

Fig. 1 is a fragmentary sectional view illustrating one form of mold member for forming the individual ice cream molds and showing a protective paper jacket in position.

Fig. 2 is a fragmentary plan view of the mold unit shown in Fig. 1.

Fig. 3 is a view similar to Fig. 1 but showing the mold compartments filled with a substance to be frozen and a supporting member having embossed portions projecting into the molds.

Fig. 4 illustrates the next step in the process after the step shown in Fig. 3, wherein the complete mold of the frozen individual molds is inverted preparatory to removing the mold from the frozen articles.

Fig. 5 illustrates the manner of supporting the individual molds upon a support member after the mold member is removed.

Fig. 6 illustrates the use of a modified form of supporting member.

Fig. 7 illustrates the preferred manner of packing individual molds for shipment.

Fig. 8 is a perspective view of one of our novel individual molds inserted in a cone preparatory to removing the sanitary paper jacket.

The invention may be best understood by following through the method from the initial step. A multiple mold member 2 having a plurality of molds 3 of frusto-conical shape is used to insure quantity production. Within each individual mold compartment is placed a paper jacket 4, as best shown in Fig. 1. The jackets 4 are preferably formed in frusto-conical shape with a distorted portion thereof as a clasp 5 and these paper jackets stacked ready for use, one paper jacket being inserted in each individual mold member 3.

Each mold member 3 is so shaped that the lower end thereof will form a mold of ice cream or the like which will extend into the standard ice cream cone from three-fourths to one inch. Accordingly, each paper jacket 4 is of such size that when placed in each individual mold 3 will extend down to a point 6 which will leave slightly more than the required three-fourths to one inch in the bottom of the mold.

The paper jackets having been placed in the individual molds, such molds are then filled with ice cream from a freezer, the ice cream being preferably in a slightly frozen or plastic state. Each mold member is filled to a point 7 which is slightly below the top of the mold and this having been done a support or top member 8 is placed on top of the mold member 2 so that support projections 9 extend down within each individual mold and preferably below the surfaces of the ice cream in such molds, each projection 9 being provided with one or more apertures so as to allow for any expansion.

The filled mold 2 and support member 8 are then placed in a hardening room and the ice cream given what is known as a "quick freezing" temperature. Inasmuch as the individual molds are fast frozen, they will, of course, be very hard and of very fine texture so it will be possible for the purchaser to bite into the ice cream, but such ice cream will still be hard enough to eliminate all melting and running for a considerable time.

After the individual molds have been frozen hard, that is, to a point considerably below freezing as is now practiced in fast freezing processes, the entire unit is dipped in water or heated by other means in order to loosen the individual ice cream molds from the metal mold members 3, after which the entire unit 2 is turned over, as best shown in Fig. 4, and the mold member 2 lifted off leaving the individual ice cream molds held in an upright position by the projections 9 of the support member 8. This last step is well illustrated in Fig. 5. Each jacket will, of course, remain upon the individual ice cream molds 10. If desired to dry the outside of the individual ice cream molds, the member 8 may be placed in the hardening room for a relatively short period of time. As the paper jackets 4 extend down to a predetermined point 6, it will be seen that a cone 11 may be placed over the inverted ice cream mold 10, as best shown at the right hand side of Fig. 5 and the ice cream mold removed from the support 8 and served. The entire unit may be served, as shown in Fig. 8, with the paper jacket 4 in place to be stripped off by the purchaser or, of course, such paper jacket may be stripped off immediately after the mold is filled. At any rate, the handling of the individual ice cream molds, regardless of the method or purpose, will in every case be a sanitary step because the hands need only contact with the paper jacket 4.

In shipping or storing the individual ice cream molds in large lots, they may be packed as best illustrated in Fig. 7 whereby the exposed ice cream portion of each individual mold will protrude past the edge of and contact with the paper jacket of an adjacent mold so as to eliminate all possibility of one ice cream mold sticking to the other. The storekeeper may then very easily reach into the carton, grasp an individual mold by the paper jacket, and very readily insert the same in a cone.

In the modification shown in Fig. 6, we have shown a support member having a wire mesh screen 12 which takes the place of the projections 9 as shown in Fig. 4. This wire screen member serves as an effective support member for the individual ice cream molds in substantially the same manner as the projections 9.

It will thus be seen that we have provided a new article of manufacture in the form of a frozen confection which is shaped to fit the cone, and is fast frozen to eliminate dripping during eating thereof. As one of the big problems in the ice cream mold industry is quantity production, it will be obvious that the clerks can handle and serve a greater number of cones in a sanitary manner because it is much easier to merely grasp and insert a form mold in position than to dip the ice cream. The paper jacket will protect the mold in case the cone is to be carried a considerable distance.

An important point in the present invention is the predetermined length of paper jacket which prevents the cream from being touched at any point in the process and still greatly facilitates the insertion of the mold into the cone and the immediate and quick removal of the paper jacket. The entire process eliminates the necessity of placing the ice cream mold on a saucer for removal of the paper wrapping as has been customary in the past; in other words, the entire step of inverting the ice cream mold, such as placing it on a saucer for removal of a paper wrapping, is completely eliminated.

What we claim is:

1. As a new article of manufacture, a frozen confection comprising a cone shaped edible holder, a preshaped mold of frozen edible substance having a portion thereof of conical shape, said portion protruding into the holder, and a paper jacket surrounding a portion of said frozen mold and terminating at a point above the holder to permit easy removal of the jacket.

2. As a new article of manufacture, a frozen confection comprising a holder having a portion at the end thereof of tapered shape, a molded edible confection having a portion at the lower end thereof frusto-conical in cross-section and extending into said holder, and a paper jacket surrounding said frozen edible confection, said paper jacket being of less length than the edible confection, and terminating at a point spaced from the top of the holder to permit easy removal of the jacket.

3. As a new article of manufacture, a frozen confection comprising a cone holder, an individual mold of fast frozen ice cream of preformed frusto-conical shape and having a portion thereof extending into the holder, the portion extending into the holder being of less length than the portion extending outside of the holder, and a paper jacket substantially covering the exposed portion of the individual mold and terminating short of the cone holder.

4. A method of the character herein described, comprising the steps of lining only a portion of a mold with an annular layer of protective material, filling a mold with material to be frozen, freezing same, removing the frozen substance and the protective wrapping whereby to leave a portion of the frozen substance protruding beyond the protective wrapping, and then inserting said protruding portion in a holder.

5. A frozen confectionary product, comprising a holder of edible substance having a portion of the top thereof of tapered cross-section, an individual preformed mold of fast frozen ice cream having a portion thereof extending into the holder, the portion extending into the holder being frusto-conical in cross section and being of considerably less length than the portion extending outside of the holder, a paper wrapping covering only the portion of the mold outside the holder, the portion of the mold extending into the holder being of substantially the same shape and contour as the enclosing portion of the holder whereby the individual mold of ice cream is firmly held by the holder.

6. As a new article of manufacture, a frozen confection comprising an edible holder open at one end and shaped to receive a molded edible confection, said molded confection being preformed and of such shape at its lower end as to fit into the open end of said holder, and a paper jacket surrounding a portion of said molded confection and terminating at a point above the point of contact between said molded confection and holder whereby said paper jacket may be removed after the free lower end of said removable confection is inserted in the holder.

7. As a new article of manufacture, a frozen confection partially encased in a temporary protective wrapper, the lower end of said confection protruding beyond the wrapper, and an edible cone of such shape and size as to receive the protruding portion of the confection and still permit easy removal of the wrapper from the frozen confection while positioned in the cone.

GEORGE W. SCHEPMAN.
WILLIAM W. MERYDITH.